United States Patent
Ho et al.

(10) Patent No.: US 11,681,328 B2
(45) Date of Patent: Jun. 20, 2023

(54) SUPPORTER AND ELECTRONIC ASSEMBLY (71) Applicant: Wistron Corp., New Taipei (TW)

(72) Inventors: Hsin Ting Ho, New Taipei (TW);
Liang Yu, New Taipei (TW)

(73) Assignee: WISTRON CORP., New Taipei (TW)

( * ) Notice: Subject to any disclaimer, the term of this patent is extended or adjusted under 35 U.S.C. 154(b) by 181 days.

(21) Appl. No.: 17/156,415

(22) Filed: Jan. 22, 2021

(65) Prior Publication Data

US 2022/0179453 A1 Jun. 9, 2022

(30) Foreign Application Priority Data

Dec. 8, 2020 (TW) .................................. 109143180

(51) Int. Cl.
*G06F 1/16* (2006.01)
*F16M 11/10* (2006.01)
*F16M 11/18* (2006.01)

(52) U.S. Cl.
CPC ........... *G06F 1/1632* (2013.01); *F16M 11/10* (2013.01); *F16M 11/18* (2013.01)

(58) Field of Classification Search
CPC ......... F16M 11/10; H04M 1/04; G06F 1/1632
See application file for complete search history.

(56) References Cited

U.S. PATENT DOCUMENTS

| | | | |
|---|---|---|---|
| 8,995,121 B2* | 3/2015 | Yen ...................... | G06F 1/1632 |
| | | | 361/679.55 |
| 9,068,687 B2* | 6/2015 | Hu ......................... | F16M 11/18 |
| 10,601,973 B1 | 3/2020 | Raghunathan | |
| 11,449,100 B2* | 9/2022 | Lam ..................... | G06F 1/1632 |
| 2013/0170131 A1 | 7/2013 | Yen | |
| 2017/0023975 A1* | 1/2017 | Nalbandian ........... | G06F 1/1626 |
| 2018/0364756 A1* | 12/2018 | Lee ........................ | F16M 11/10 |

FOREIGN PATENT DOCUMENTS

| | | |
|---|---|---|
| CN | 102090803 B | 7/2012 |
| CN | 103186184 A | 7/2013 |
| CN | 204360267 U * | 5/2015 |
| CN | 204360267 U | 5/2015 |
| CN | 105715916 A | 6/2016 |
| WO | WO 2019/028003 A1 | 2/2019 |

* cited by examiner

*Primary Examiner* — Dedei K Hammond
*Assistant Examiner* — Bryan Van Huynh (57) ABSTRACT

A supporter is provided, and includes a base, a holder, and a linkage assembly. The base has a surface and a groove that is formed on the surface. The holder is disposed on the surface of the base. The linkage assembly is disposed in the base. The linkage assembly is rotatable relative to the base. The linkage assembly includes a first shaft, a second shaft, and a linkage member. The first shaft is at least partially disposed in the groove. The second shaft is connected to the holder. The linkage member is connected to the first shaft and the second shaft. The linkage member is configured to link the first shaft to the second shaft.

16 Claims, 10 Drawing Sheets

SUPPORTER AND ELECTRONIC ASSEMBLY

CROSS REFERENCE TO RELATED APPLICATIONS

This application claims priority of Taiwan Patent Application No. 109143180, filed on Dec. 8, 2020, the entirety of which is incorporated by reference herein.

BACKGROUND

Technical Field

The disclosure relates to a supporter and an electronic assembly, and in particular to a supporter and an electronic assembly that may adjust the angle of an electronic device.

Description of the Related Art

With the development of technology, the application of electronic devices has become more and more popular. In particular, portable electronic devices (such as laptops, tablets, cell phones, etc.) have increasingly been favored by consumers due to their convenience. In order to enhance the usability and performance of portable electronic devices, many bases and expansion equipment that match the portable electronic devices have appeared on the market. However, existing bases are not satisfactory in all respects, and there is still room for improvement.

BRIEF SUMMARY

The present disclosure provides a supporter. The supporter includes a base, a holder, and a linkage assembly. The base has a surface and a groove that is formed on the surface. The holder is disposed on the surface of the base. The linkage assembly is disposed in the base and rotatable relative to the base. The linkage assembly includes a first shaft, a second shaft, and a linkage member. The first shaft is at least partially disposed in the groove. The second shaft is connected to the holder. The linkage member is connected to the first shaft and the second shaft, and is configured to link the first shaft to the second shaft.

The present disclosure provides an electronic assembly. The electronic assembly includes a supporter and an electronic device. The supporter includes a base, a holder, and a linkage assembly. The base has a surface and a groove that is formed on the surface. The holder is disposed on the surface of the base. The linkage assembly is disposed in the base and rotatable relative to the base. The linkage assembly includes a first shaft, a second shaft, and a linkage member. The first shaft is at least partially disposed in the groove. The second shaft is connected to the holder. The linkage member is connected to the first shaft and the second shaft, and is configured to link the first shaft to the second shaft. The electronic device is removably disposed in the groove. The electronic device abuts the holder.

BRIEF DESCRIPTION OF THE DRAWINGS

The disclosure may be more fully understood by reading the subsequent detailed description and examples with references made to the accompanying drawings, wherein.

DETAILED DESCRIPTION OF THE INVENTION

The supporters and electronic assemblies of some embodiments of the present disclosure are described in the following description. However, it should be appreciated that the following detailed description of some embodiments of the disclosure provides various concepts of the present disclosure which may be performed in specific backgrounds that may vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure. Unless defined otherwise, the first or second element, material and/or portion in the claims may be interpreted as any element, material and/or portion in the specification as long as it conforms to the description in the claims.

Unless defined otherwise, all terms (including technical and scientific terms) used herein have the same meaning as commonly understood by one of ordinary skill in the art to which the present disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exact the same as the description herein. It should be noted that unless defined specifically, even if the above terms are not recited in the description, it should be read as the same meaning as those approximate terms are recited.

Figure 1:
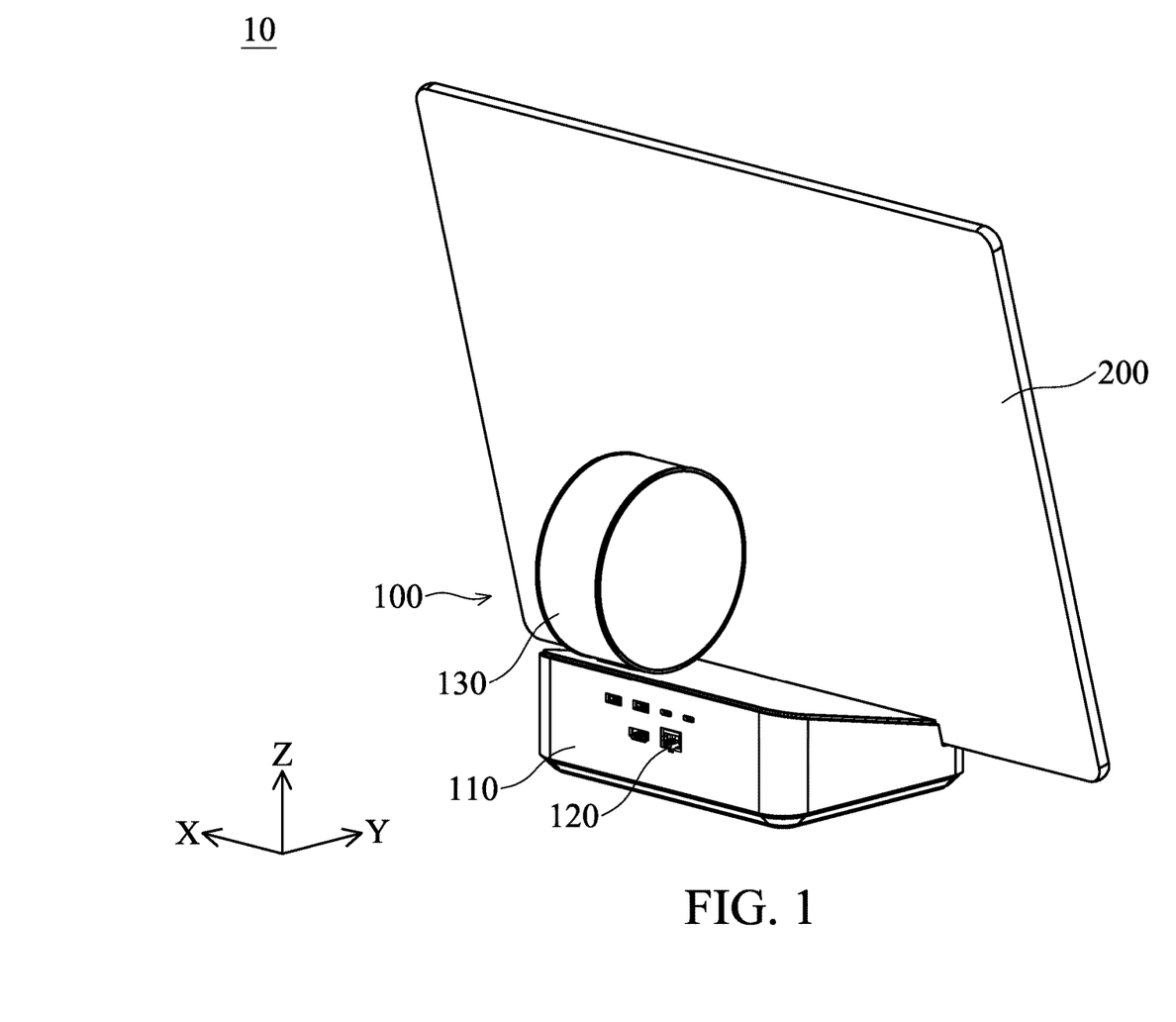
FIG. 1 illustrates a perspective view of an electronic assembly in accordance with some embodiments of the present disclosure.

FIG. 1 illustrates a perspective view of an electronic assembly 10 in accordance with some embodiment of the present disclosure. As shown in FIG. 1, the electronic assembly 10 may include a supporter 100 and an electronic device 200. The electronic device 200 may include a tablet device (for example, any other suitable electronic device such as a tablet), but the present disclosure is not limited thereto. In some embodiments, the supporter 100 includes a base 110, an expansion slot 120 formed on the base 110, and a holder 130 disposed over the base 110. The electronic device 200 may be disposed on the base 110, so that the electronic device 200 may be supported at an appropriate angle, providing users with a good visual experience.

For example, the expansion slot 120 may include an interface for transmitting data by such as Universal Serial Bus (USB), High Definition Multimedia Interface (HDMI) or any other suitable method, but the present disclosure is not limited thereto. As such, when the electronic device 200 is installed on the base 110, the electronic device 200 may be connected to other devices or equipment via the expansion slot 120 to enhance the performance of the electronic device 200. In addition, the holder 130 may be configured to abut the electronic device 200, thereby providing a more stable support for the electronic device 200.

Figure 2:
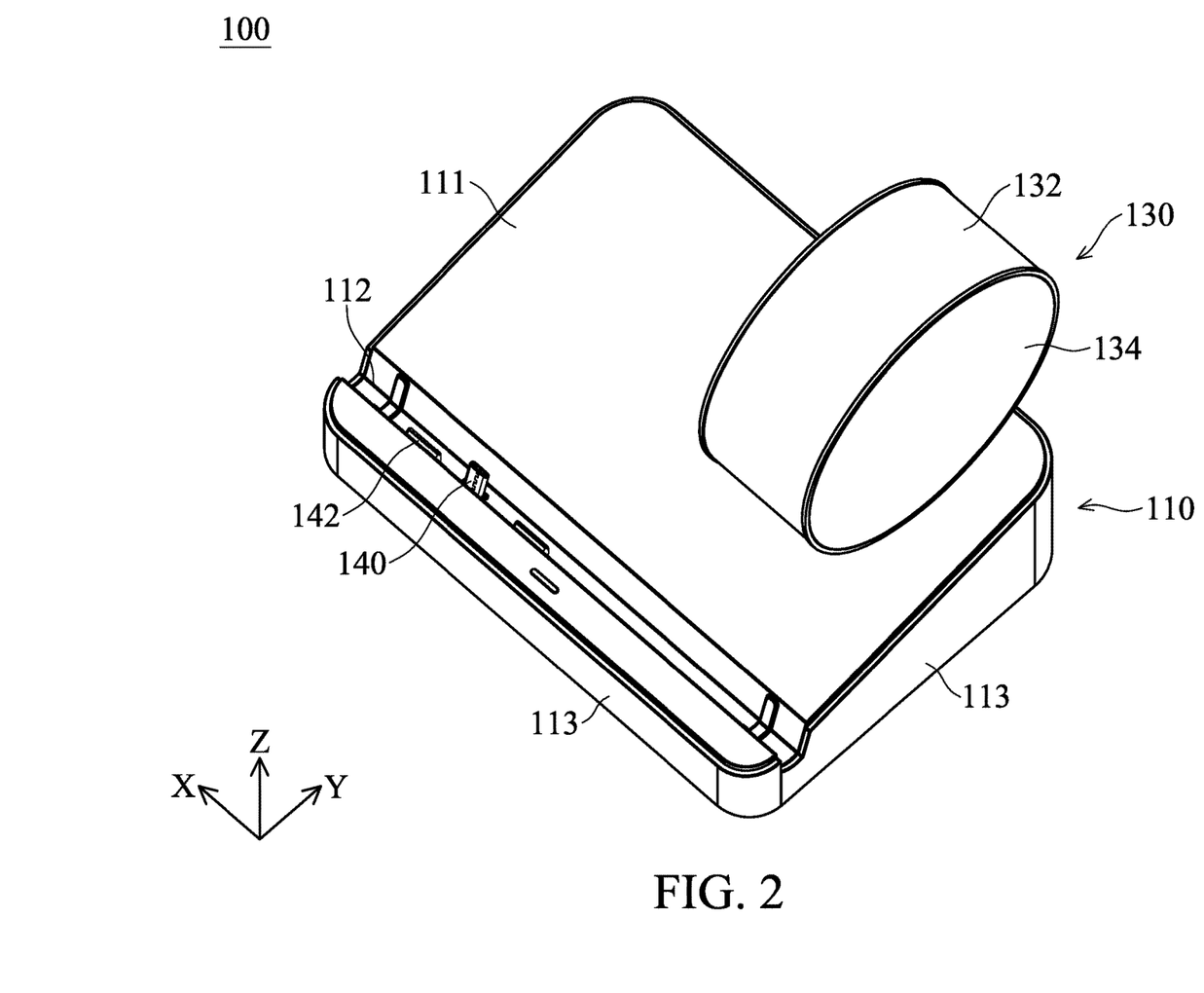
FIG. 2 illustrates a perspective view of a supporter in accordance with some embodiments of the present disclosure.

FIG. 2 illustrates a perspective view of the supporter 100 in accordance with some embodiments of the present disclosure. As shown in FIG. 2, the base 110 has an upper surface 111, a groove 112 formed on the upper surface 111, and a plurality of sidewalls 113 surrounding the upper surface 111. In the present embodiment, the upper surface 111 may be inclined with respect to a horizontal plane (for example, the X-Y plane), but the present disclosure is not limited thereto. The groove 112 may be configured to accommodate the electronic device 200. In the present embodiment, the supporter 100 further includes a connector 140 and a positioning portion 142 that protrude from the surface of the groove 112 (for example, the bottom surface of the groove 112). The connector 140 may be electrically connected to the electronic device 200 for transmitting electrical signals from the electronic device 200, so that the electronic device 200 is electrically connected to the expansion slot 120 and other devices. The positioning portion 142 may be configured to correspond to the electronic device 200 for a positioning purpose. However, the configuration shown in the present disclosure is only an example, and it is not intended to limit the scope of the present disclosure.

In addition, the holder 130 includes an annular wall 132 and side surfaces 134, wherein the annular wall 132 is disposed to surround and connect the side surfaces 134 that are opposite to each other, and the annular wall 132 is configured to abut the electronic device 200. The above design may achieve the effect of simple and beautiful appearance. It should be understood that, although the holder 130 has an annular structure in the present embodiment, the structure of the holder 130 may be adjusted by those skilled in the art as required.

Figure 3:
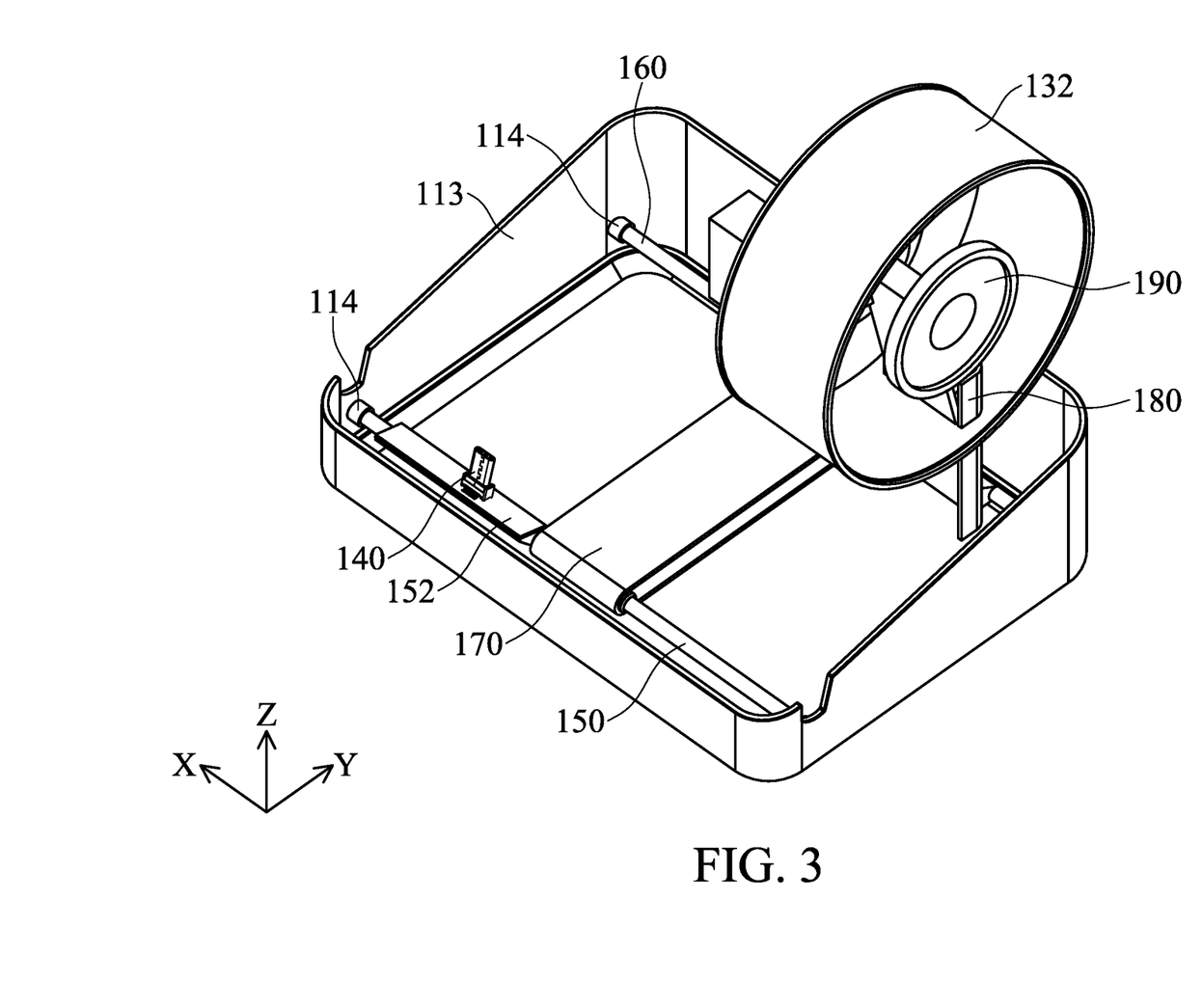
FIG. 3 illustrates an internal structure of the supporter in accordance with some embodiments of the present disclosure.

FIG. 3 illustrates an internal structure of the supporter 100 in accordance with some embodiments of the present disclosure. It should be noted that, in order to clearly illustrate the internal structure of the supporter 100, the upper surface 111 of the base 110 and the side surface 134 of the holder 130 are not shown in the present embodiment. As shown in FIG. 3, the supporter 100 further includes a first shaft 150 and a second shaft 160, which are respectively connected to the sidewalls 113 of the base 110. More specifically, the first shaft 150 and the second shaft 160 are respectively received in receiving structures 114 of the sidewalls 113 and rotatable relative to the base 110 in the receiving structures 114.

In addition, the connection belt 170 connects the first shaft 150 and the second shaft 160, and is configured to drive the first shaft 150 and the second shaft 160 to rotate synchronously. More specifically, when the first shaft 150 rotates, the connection belt 170 is driven by the first shaft 150 to rotate at the same time, thereby driving the second shaft 160 to rotate relative to the base 110. Similarly, when the second shaft 160 rotates, the connection belt 170 is driven by the second shaft 160 to rotate at the same time, thereby driving the first shaft 150 to rotate relative to the base 110. The operation mode of the first shaft 150, the second shaft 160 and the connection belt 170 will be further explained below in accompany with FIGS. 9A and 9B.

In the present embodiment, a plane 152 is formed on the first shaft 150, and the connector 140 and the positioning portion 142 are disposed on the plane 152. At least a portion of the plane 152 is disposed in the groove 112 so that the connector 140 and the positioning portion 142 are disposed in the groove 112. As such, the connector 140 and the positioning portion 142 are rotatable with the first shaft 150 relative to the base 110. Although the circuit structure is not explicitly shown in the present embodiment, those skilled in the art should understand that a circuit may be disposed inside the base 110 in any suitable manner to electrically connect the connector 140 and the expansion slot 120 (as shown in FIG. 1), so that the electronic device 200 is connected to other devices or equipment via the expansion slot 120. In addition, in some embodiments, a counterweight (not shown) may be disposed in the base 110 as required to adjust the weight distribution of the base 110 so that the base 110 may hold the electronic device 200 more stably.

In the present embodiment, the side surface 134 of the holder 130 is not shown to clearly show the internal structure of the holder 130. A support column 180 is connected to the second shaft 160 and may penetrate the annular wall 132 and/or the upper surface 111 of the base 110 to be connected to the holder 130. In some embodiments, a speaker 190 may be disposed in the holder 130. Similarly, although the circuit structure is not explicitly shown in the present embodiment, those skilled in the art should understand that the connector 140 and the speaker 190 may be electrically connected in any suitable manner. As such, when the electronic device 200 is electrically connected to the connector 140, sound may come out of the speaker 190, providing a good user experience for the users.

Figure 4:
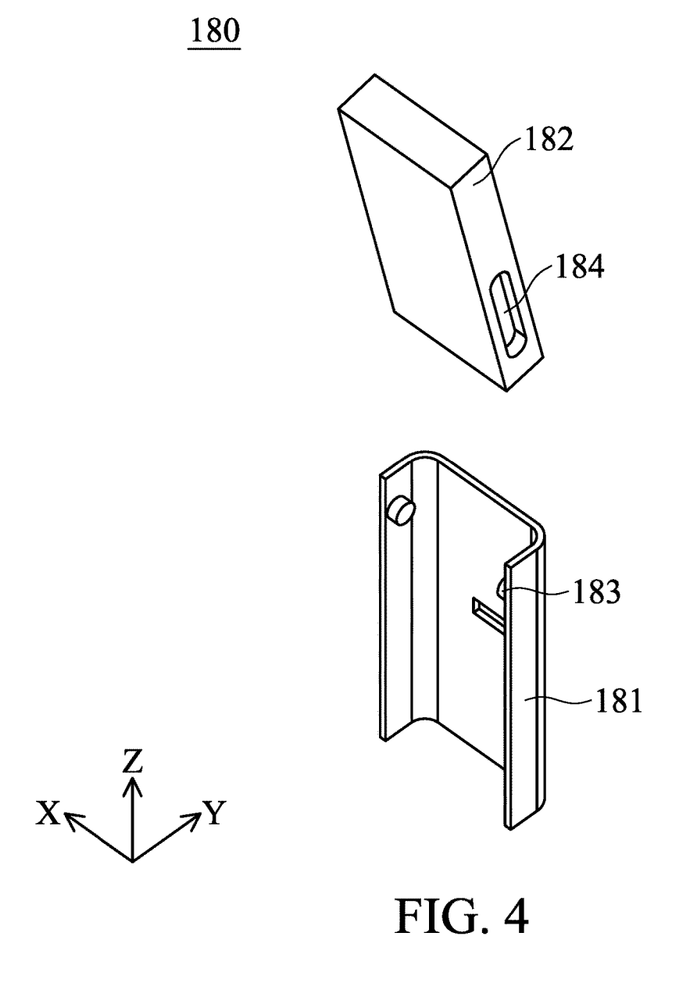
FIG. 4 illustrates an exploded view of a support column in accordance with some embodiments of the present disclosure.

FIG. 4 illustrates an exploded view of the support column 180 in accordance with some embodiments of the present disclosure. As shown in FIG. 4, the support column 180 includes a first section 181 and a second section 182. For example, the first section 181 may be connected to the second shaft 160, and the second section 182 may be connected to the holder 130, but the present disclosure is not limited thereto. In the present embodiment, the first section 181 has a protrusion 183, the second section 182 has a through hole 184, and the protrusion 183 is correspondingly disposed in the through hole 184 for combining the first section 181 and the second section 182. In other words, the first section 181 may surround a portion of the second section 182. That is, the maximum width of the first section 181 may be greater than the maximum width of the second section 182, wherein the maximum width of the first section 181 and the second section 182 may be measured along the X axis, but the present disclosure is not limited thereto.

With the above configuration, the second section 182 may be movably pivoted to the first section 181, so that the holder 130 is movable according to the position of the electronic device 200. In the present embodiment, the cross-sectional area of the through hole 184 may be greater than the cross-sectional area of the protrusion 183, wherein the cross-sectional areas of the protrusion 183 and the through hole 184 may be measured along the Y-Z plane, for example, so that the second section 182 may move more flexibly. However, the present disclosure is not limited thereto. Any method is acceptable as long as the first section 181 and the second section 182 may be movably combined with each other. For example, in some embodiments, the first section 181 has a through hole, and the second section 182 has a protrusion. The protrusion of the second section 182 may be combined to the through hole of the first section 181 to movably combine the first section 181 and the second section 182 with each other. Similarly, in the above embodiment, the cross-sectional area of the through hole of the first section 181 may be greater than the cross-sectional area of the protrusion of the second section 182.

Figure 5:
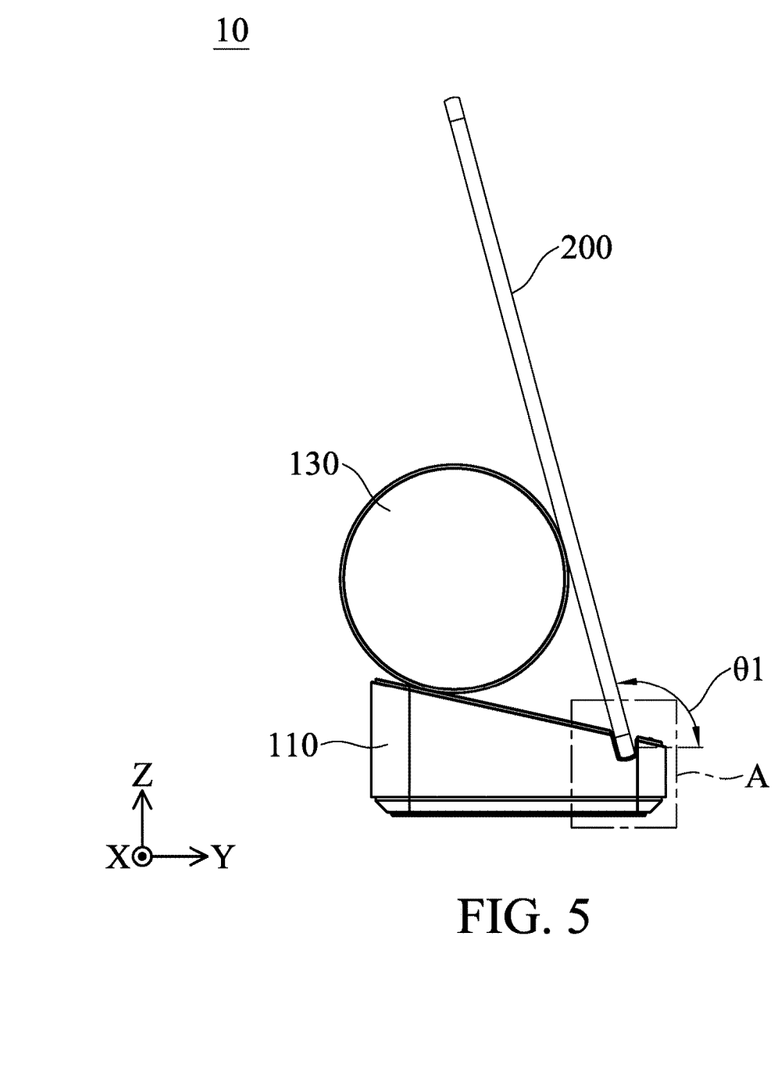
FIG. 5 illustrates a perspective view of the electronic assembly in accordance with some embodiments of the present disclosure.
Figure 6:
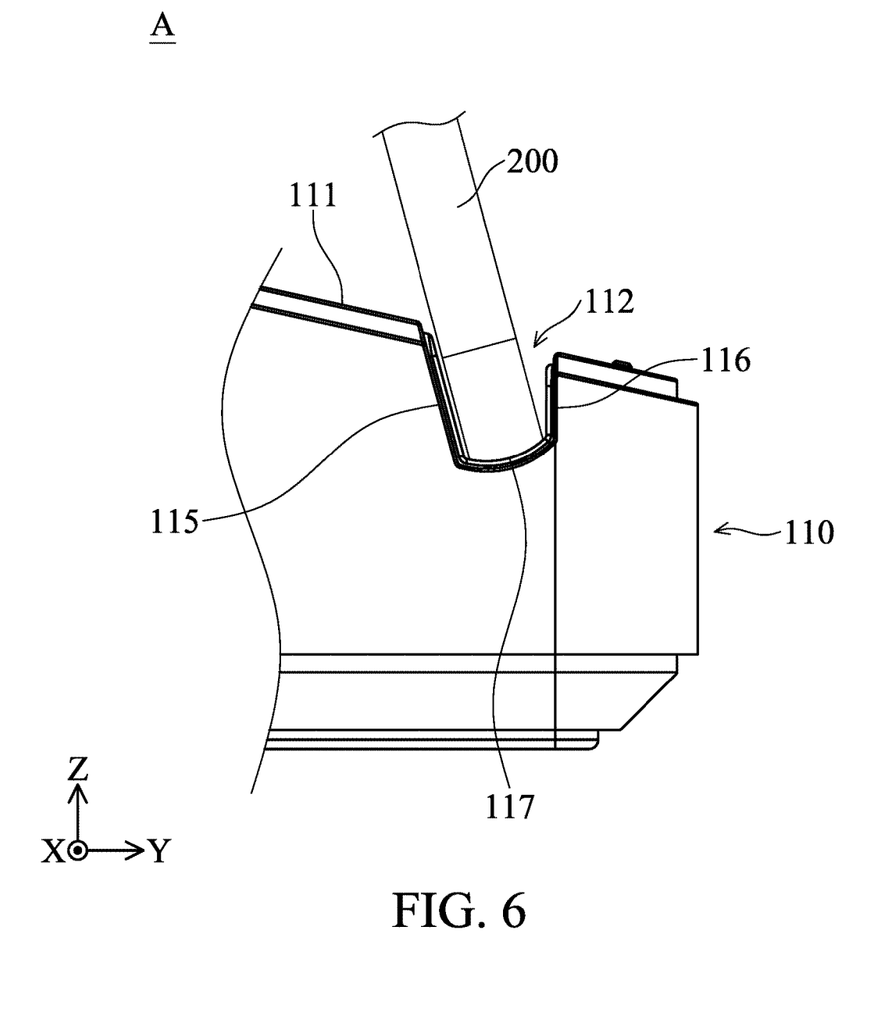
FIG. 6 illustrates a partial enlarged view of the region A shown in FIG. 5.

FIG. 5 illustrates a perspective view of the electronic assembly 10 in accordance with some embodiments of the present disclosure. In the present embodiment, a first angle θ1 between the electronic device 200 and the horizontal plane (such as the X-Y plane) may be in a range from 125 degrees to 135 degrees, such as 130 degrees. However, it is only an example and is not intended to limit the scope of the present disclosure. As shown in FIG. 5, the electronic device 200 is disposed on the base 110 and abuts against the holder 130. FIG. 6 illustrates a partial enlarged view of the region A shown in FIG. 5. As shown in FIG. 6, the groove 112 has a first sidewall 115, a second sidewall 116 and a bottom surface 117. The bottom surface 117 is located between the first sidewall 115 and the second sidewall 116, and the first sidewall 115 and the second sidewall 116 are connected to the bottom surface 117. In some embodiments, an angle is formed between the first sidewall 115 and the second sidewall 116.

In the present embodiment, the electronic device 200 may optionally lean on the first sidewall 115 or the second sidewall 116. When the electronic device 200 leans against the first sidewall 115, a gap is between the electronic device 200 and the second sidewall 116. When the electronic device 200 abuts against the second sidewall 116, there is a gap between the electronic device 200 and the first sidewall 115. In other words, the first sidewall 115 and the second sidewall 116 are not parallel. To be more specific, the angle between the first sidewall 115 and a horizontal plane (such as the X-Y plane) is different from the angle between the second sidewall 116 and the horizontal plane. For example, the angle between the first sidewall 115 and the horizontal plane may be, for example, 135 degrees, and the angle between the second sidewall 116 and the horizontal plane may be, for example, 85 degrees. However, the present disclosure is not limited thereto. In the present embodiment, since the upper surface 111 is inclined, the top of the first sidewall 115 is higher than the top of the second sidewall 116, but it is not limited thereto. With the arrangement of the first sidewall 115 and the second sidewall 116, the angle of the electronic device 200 relative to the user may be controlled, and the user may adjust the angle of the electronic device 200 as required to have the best experience. For example, the included angle between the first sidewall 115 and the second sidewall 116 may be in the range from 10 degrees to 20 degrees, but it is not limited thereto. In some embodiments, a buffer material is disposed in the groove 112 to prevent damage due to the insertion force or wear of the mating interface (not shown) of the electronic device 200, the connector 140, and the positioning portion 142. Alternatively, a chamfered structure or a rounded structure (not shown) is disposed in the opening of the groove 112 to increase the angle of introduction when the tablet is inserted, and also to prevent the tablet from colliding with the corners of the groove 112 when inserted.

Figure 7:
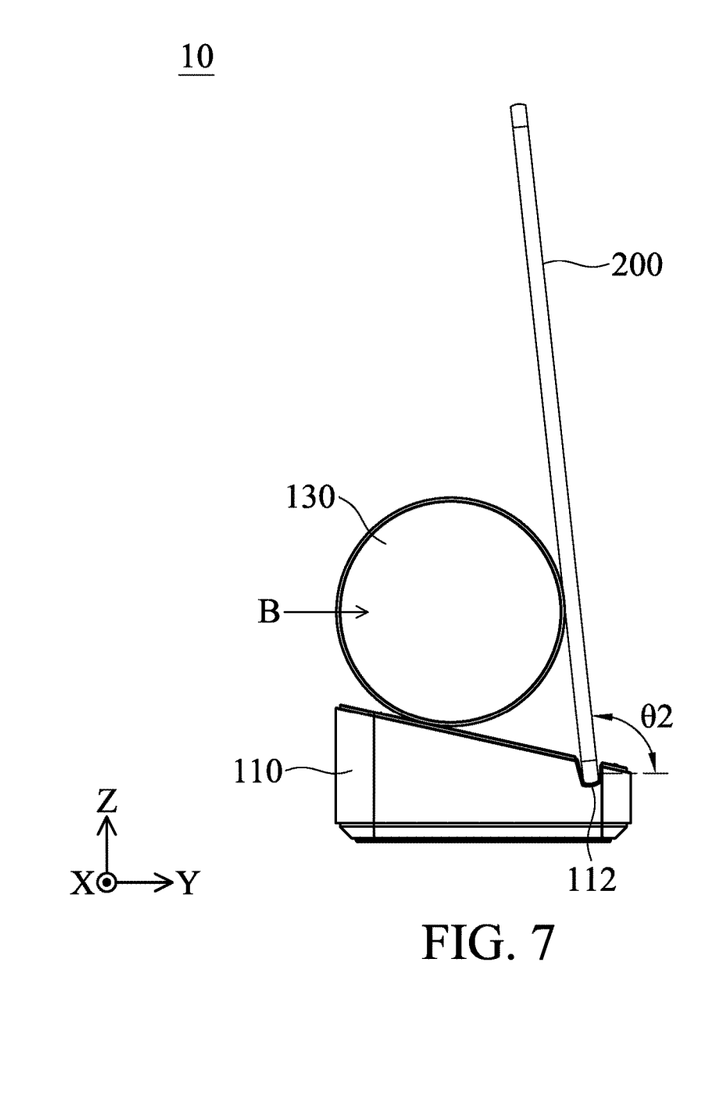
FIGS. 7 and 8 illustrate schematic views of the electronic assembly in accordance with some embodiments of the present disclosure.

FIG. 7 illustrates a schematic view of the electronic assembly 10 in accordance with some embodiments of the present disclosure. In the present embodiment, the holder 130 may be pushed to move along the direction B, thereby changing the angle between the electronic device 200 and the horizontal plane (for example, the X-Y plane). Similarly, the electronic device 200 may also be pushed to move the holder 130 along the direction B. As shown in FIG. 7, a second angle θ2 between the electronic device 200 and the horizontal plane may be in the range from 95 degrees to 125 degrees, such as 100 degrees. However, it is only an example and is not intended to limit the scope of the present disclosure. In some embodiments, the second angle θ2 may be smaller than the first angle θ1. At this time, the electronic device 200 is located between the first sidewall 115 and the second sidewall 116 of the groove 112 (as shown in FIG. 6).

Figure 8:
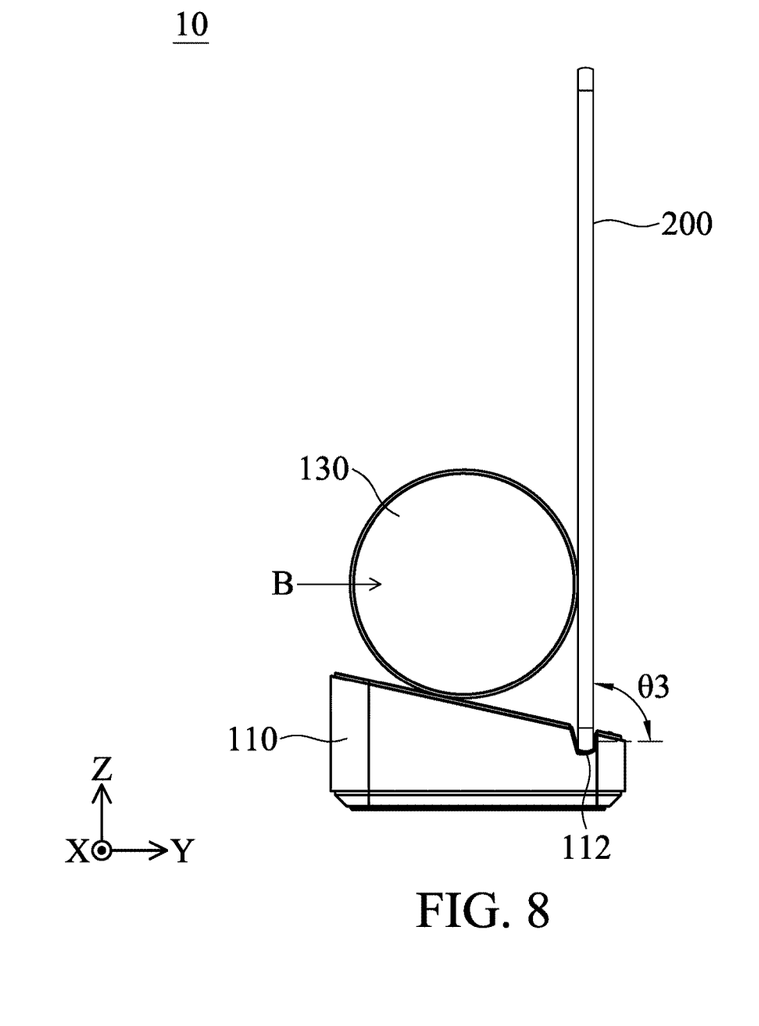

FIG. 8 illustrates a schematic view of the electronic assembly 10 in accordance with some embodiments of the present disclosure. In the present embodiment, the holder 130 may be further pushed to move in the direction B, thereby changing the angle between the electronic device 200 and a horizontal plane (such as the X-Y plane). The electronic device 200 may also be pushed to make the holder 130 moves in the direction B. As shown in FIG. 8, a third angle θ3 between the electronic device 200 and the horizontal plane may be in the range from 85 degrees to 95 degrees, such as 90 degrees. However, it is only an example and is not intended to limit the scope of the present disclosure. In some embodiments, the third angle θ3 may be smaller than the second angle θ2. At this time, the electronic device 200 may lean on the first sidewall 115 (as shown in FIG. 6). It should be understood that the movable angular range of the electronic device 200 depends on the included angles between the first sidewall 115 of the groove 112 and a horizontal plane and between the second sidewall 116 of the groove 112 and the horizontal plane. Therefore, the movable angular range of the electronic device 200 may be changed by adjusting the included angles between the first sidewall 115 and the horizontal plane and between the second sidewall 116 and the horizontal plane.

Figure 9A:
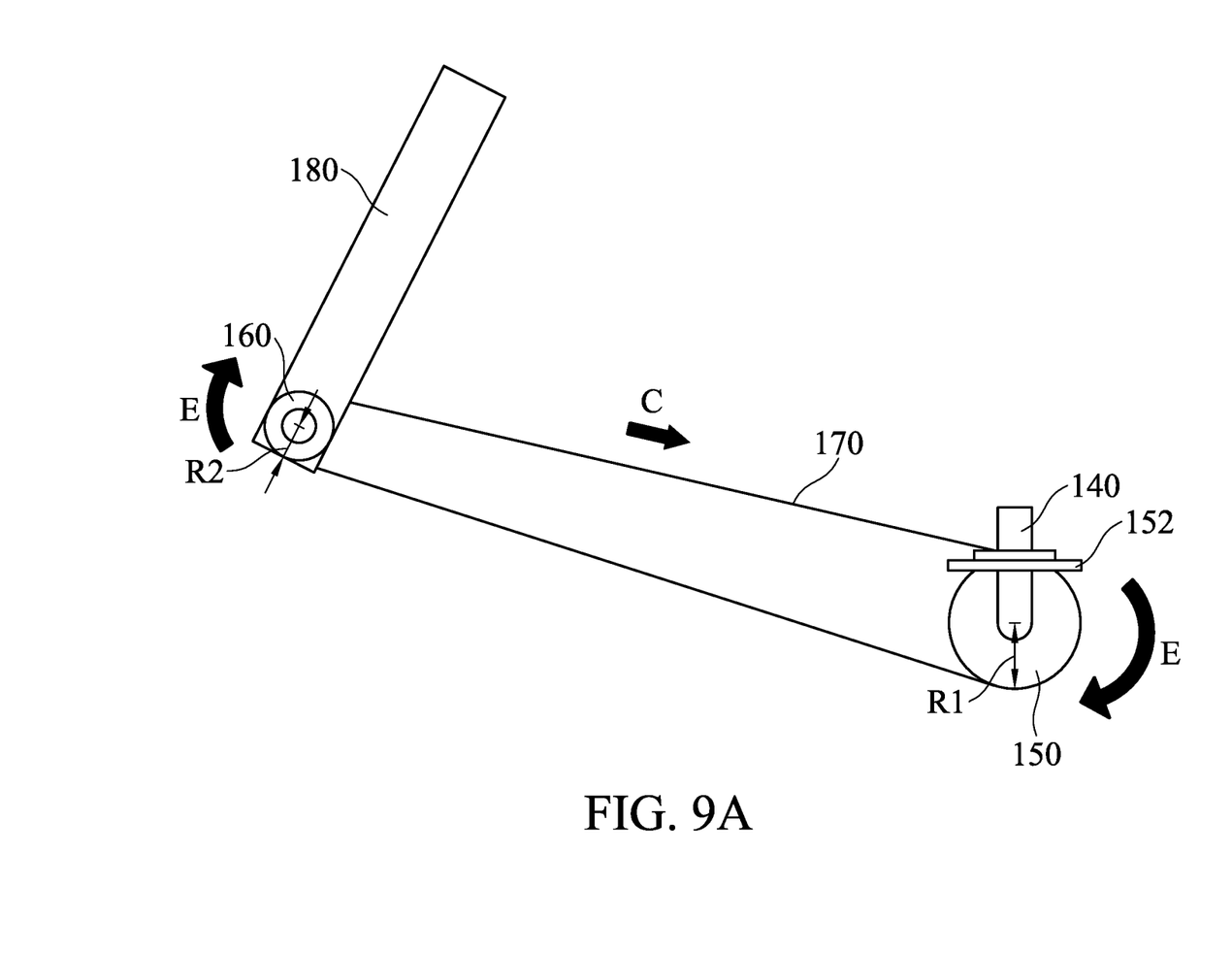
FIGS. 9A and 9B illustrate schematic views of the operation of a first shaft and a second shaft in accordance with some embodiments of the present disclosure.
Figure 9B:
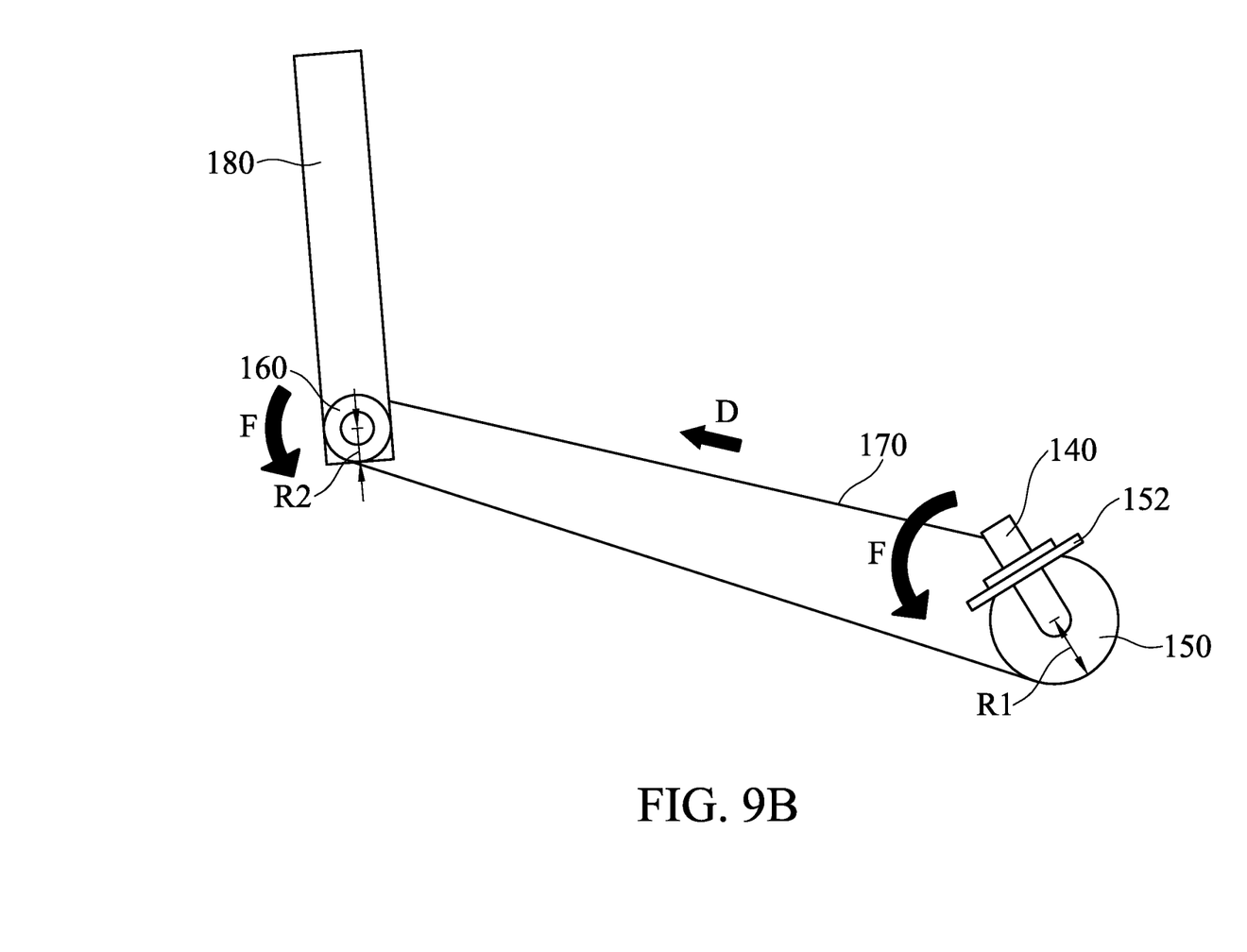

FIGS. 9A and 9B illustrate schematic views of the operation of the first shaft 150 and the second shaft 160 in accordance with some embodiments of the present disclosure. As set forth above, the connection belt 170 connects the first shaft 150 and the second shaft 160 and is configured to drive the first shaft 150 and the second shaft 160 to rotate synchronously. As shown in FIG. 9A, when the holder 130 is pushed to move in the direction B, the second shaft 160 that is connected to the holder 130 via the support column 180 would rotate in the direction E, driving the connection belt 170 to rotate in the direction C, and then the first shaft 150 is driven to rotate in the direction E. As such, the support column 180 (or the holder 130) moves closer to the connector 140 (or the electronic device 200 disposed on the connector 140). Similarly, the connector 140 may also be moved to drive the connection belt 170 to rotate in the direction C, which will not be described in detail.

As shown in FIG. 9B, when the holder 130 is pushed to move in the direction opposite to the direction B, the second shaft 160 that is connected to the holder 130 via the support column 180 would rotate in the direction F, which is the opposite direction of the direction E, driving the connection belt 170 to rotate in the direction D, and then the first shaft 150 is driven to rotate in the direction F. As such, the support column 180 (or the holder 130) moves away from the connector 140 (or from the electronic device 200 disposed on the connector 140). Similarly, the connector 140 may also be moved to drive the connection belt 170 to rotate in the direction D, which will not be discussed in detail. In the present embodiment, the radius R1 of the first shaft 150 is greater than the radius R2 of the second shaft 160. Therefore, the electronic device 200 connected to the first shaft 150 may be adjusted to the desired angle by slightly pushing the holder 130 connected to the second shaft 160, which is effortless. It should be noted that the electronic device 200 needs to face the connector 140 to be connected to the connector 140. That is, the electronic device 200 needs to be oriented in a direction that is parallel to the connector 140 in order to be inserted into the connector 140. With the above design, even if the user removes the electronic device 200 from the base 110, next time the electronic device 200 would still remain at the angle set by the user.

In summary, the present disclosure provides a supporter and an electronic assembly that may adjust the angle of an electronic device. By arranging the sidewalls of the groove for accommodating the electronic device to be non-parallel and matching the transmission assembly inside the supporter, the user may adjust the angle of the electronic device as required to have the best experience. In addition, the supporter may be designed to match other electronic equipment to expand the functions of the electronic device. In addition, the present disclosure also provides a beautiful and concise design, which is both functional and attractive, and meets the needs of consumers.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A supporter, comprising:
   a base having a surface and a groove formed on the surface;
   a holder disposed on the surface of the base;
   a linkage assembly disposed in the base, wherein the linkage assembly is rotatable relative to the base, and comprises:
   a first shaft disposed adjacent to the groove;
   a second shaft connected to the holder; and
   a linkage member connected to the first shaft and the second shaft and configured to link the first shaft to the second shaft; and
   a support column penetrating the surface of the base and connected to the holder.

2. The supporter as claimed in claim 1, wherein the groove has a bottom surface, a first sidewall, and a second sidewall, the bottom surface is connected to the first sidewall and the second sidewall, and an angle is formed between the first sidewall and the second sidewall.

3. The supporter as claimed in claim 1, wherein the first shaft and the second shaft are disposed in the base and rotatable relative to the base, and the first shaft is parallel to the second shaft.

4. The supporter as claimed in claim 1, further comprising a connector disposed on the first shaft and protruding from the groove.

5. The supporter as claimed in claim 1, wherein the support column comprises:
   a first section connected to the second shaft; and
   a second section connected to the holder and pivoted to the first section.

6. The supporter as claimed in claim 5, wherein the first section has a protrusion, the second section has a through hole, and the first section is pivoted to the second section via the protrusion.

7. The supporter as claimed in claim 1, wherein the support column is fixedly connected to the second shaft.

8. The supporter as claimed in claim 1, wherein the linkage member is a connection belt, the connection belt connects the first shaft and the second shaft and is configured to drive the first shaft and the second shaft to rotate synchronously.

9. The supporter as claimed in claim 1, wherein a radius of the first shaft is greater than a radius of the second shaft.

10. The supporter as claimed in claim 1, further comprising a speaker disposed in the holder.

11. The supporter as claimed in claim 1, wherein the base further has a positioning portion protruding from the groove.

12. An electronic assembly, comprising:
    a supporter, comprising:
    a base having a surface and a groove formed on the surface;
    a holder disposed on the surface of the base; and
    a linkage assembly disposed in the base, wherein the linkage assembly is rotatable relative to the base, and comprises:
    a first shaft disposed adjacent to the groove;
    a second shaft connected to the holder; and
    a linkage member connected to the first shaft and the second shaft and configured to link the first shaft to the second shaft; and
    an electronic device removably disposed in the groove and abutting the holder,
    wherein the base further comprises a support column penetrating the surface of the base and connected to the holder.

13. The electronic assembly as claimed in claim 12, wherein the groove has a bottom surface, a first sidewall, and a second sidewall, the bottom surface is connected to the first sidewall and the second sidewall, and an angle is formed between the first sidewall and the second sidewall.

14. The electronic assembly as claimed in claim 12, wherein the first shaft and the second shaft are disposed in the base and rotatable relative to the base, and the first shaft is parallel to the second shaft.

15. The electronic assembly as claimed in claim 12, wherein the base further comprises a connector disposed on the first shaft and protruding from the groove, and the connector is electrically connected to the electronic device.

16. The electronic assembly as claimed in claim 12, wherein the linkage member is a connection belt, the connection belt connects the first shaft and the second shaft and is configured to drive the first shaft and the second shaft to rotate synchronously.

* * * * *